United States Patent [19]

Giacomini

[11] Patent Number: 5,743,340
[45] Date of Patent: Apr. 28, 1998

[54] WEED PULLING APPARATUS

[76] Inventor: Michael E. Giacomini, P.O. Box 726, Ross, Calif. 94957

[21] Appl. No.: 724,226

[22] Filed: Oct. 2, 1996

Related U.S. Application Data

[63] Continuation of Ser. No. 336,255, Nov. 7, 1994, abandoned, which is a continuation-in-part of Ser. No. 44,383, Apr. 1, 1993, abandoned.

[51] Int. Cl.⁶ ............................................. B66F 3/00
[52] U.S. Cl. .......................... 172/371; 254/132; 294/50.8
[58] Field of Search .................... 172/371, 372, 172/373, 378, 380, 381; 37/302; 254/18, 23, 24, 132; 24/134 P

[56] References Cited

U.S. PATENT DOCUMENTS

| 328,983 | 10/1885 | Tompkins | 254/132 |
|---|---|---|---|
| 343,814 | 6/1886 | Hedden | 24/134 P |
| 603,054 | 4/1898 | Copp | 254/132 |
| 643,725 | 2/1900 | McCann | 254/132 |
| 701,519 | 6/1902 | Sleeter | 254/132 |
| 935,020 | 9/1909 | Harvey | 254/132 |
| 1,269,683 | 6/1918 | Claypool | 254/23 |
| 1,387,883 | 8/1921 | Clark | 172/371 |
| 1,502,246 | 7/1924 | Hagopian | 254/132 |
| 1,545,229 | 7/1925 | Bartran | 162/371 |
| 1,572,426 | 2/1926 | Foote | 172/438 |
| 1,665,183 | 4/1928 | Urban | 172/378 |
| 1,797,101 | 3/1931 | Ray | 172/374 |
| 3,059,905 | 10/1962 | Tompkins | 254/132 |
| 3,116,796 | 1/1964 | Miljan | 172/131 |
| 3,293,674 | 12/1966 | Sapia | 172/371 X |
| 3,750,760 | 8/1973 | Shockley | 172/374 |
| 3,767,251 | 10/1973 | San Filipo | 172/378 X |
| 3,921,725 | 11/1975 | Trutor et al. | 172/374 |
| 3,985,382 | 10/1976 | Wheeler | 294/50.6 |
| 4,673,165 | 6/1987 | Nelson et al. | 294/50.8 |
| 4,843,687 | 7/1989 | Kroepelin, Jr. | 24/134 P |
| 4,856,759 | 8/1989 | Ness | 254/132 |
| 4,930,825 | 6/1990 | Dearman | 172/378 |

FOREIGN PATENT DOCUMENTS

| 3939458 | 7/1990 | Germany | 254/18 |
|---|---|---|---|
| 275526 | 8/1927 | United Kingdom | 254/132 |

Primary Examiner—Terry Lee Melius
Assistant Examiner—Robert Pezzuto
Attorney, Agent, or Firm—Townsend and Townsend and Crew LLP

[57] ABSTRACT

A device for pulling weeds, plants, small trees and the like includes an elongate handle portion terminating in a first end, with a leveraging head member attached to the first end. This leveraging head member has a first side bearing a weed clamp having at least one pivoting jaw adapted to close proximate a clamping surface, and a second side opposite the first side bearing a lever arm for mechanical advantage.

5 Claims, 2 Drawing Sheets

WEED PULLING APPARATUS

BACKGROUND OF THE INVENTION

This application is a continuation of application Ser. No. 08/336,255, filed Nov. 7, 1994 now abandoned, which in turn is a continuation-in-part of U.S. application Ser. No. 08/044,383 filed Apr. 1, 1993 now abandoned.

FIELD OF THE INVENTION

This invention relates generally to agricultural and garden tools, and more specifically to an improved device for pulling weeds, plants, small trees and the like.

DESCRIPTION OF THE PRIOR ART

A common chore of garden and lawn care is the removal of weeds, small trees and the like, and numerous processes and devices have been proposed for assisting with this chore. Frequently, such weed removal is accomplished by the use of chemicals. However, these chemicals are expensive and are often toxic to animals and humans, as well as to the plants. Alternatively, various types of garden tools have been proposed heretofore for accomplishing weed removal. Unfortunately, many of the prior art weed pullers are hand tools, having relatively short handles which require that the gardener be sitting on the ground or bending or stooping in order to engage the weed puller with the weed and to accomplish its removal. Sitting may be appropriate when the gardener has to do considerable work in a close area. However, it is not appropriate for removing isolated weeds. Consequently, a gardener spends much time bending or stooping, which places considerable strain on the gardener's back muscles. This can be extremely painful, especially for elderly gardeners, and can aggravate pre-existing conditions, such as arthritis. Other weed pullers have longer handles, which enable the gardener to use them from a standing position, but are difficult to engage with the weeds or to operate to remove the weeds. Some prior art weed pullers have been hard to engage or disengage from the weeds or have required substantial physical effort on the part of the gardener in order to displace the weed. Still other prior art weed pulling devices have been complex and expensive devices which have required considerable maintenance. Even more of the prior art weed pulling devices have simply been ineffective.

SUMMARY OF THE INVENTION

The weed pulling apparatus of the present invention provides an improved garden and agricultural device for pulling weeds, plants, small trees and the like. The inventive apparatus includes an elongate leveraging handle portion terminating in a first lower end, with a laterally extending leveraging head member attached to the first lower end. This leveraging head member has a first side upon which is mounted a weed clamp having at least one pivoting jaw adapted to close proximate a clamping surface. On the opposite side of the leveraging head is mounted second side opposite the first side bearing a second lever arm which also functions as the full arm about which the leveraging handle pivots.

The advantages of the present invention are preferably attained by providing an elongated handle to enable the gardener to operate the tool from an erect position. The leveraging head member may take the form of a blade, hoe or mattock, and may be curved or straight. The weed clamp on the opposite side from the lever arm forcibly grips and retains the weed or plant stems during the uprooting operation. The jaws are formed with cam faces so that the stem will cam them open when the jaws are forcibly moved into contact with the stem. After the plant has been uprooted, the tool can be easily manipulated to cause the jaws to release the plant stem from its grip.

The disadvantages of the prior art are overcome with the present invention and an improved weed puller is provided which is simple in construction and operation, inexpensive to purchase, requires virtually no maintenance, yet can quickly and easily be engaged with or disengaged from a weed, while the gardener is in an erect position and with little physical effort on the part of the gardener.

Accordingly, it is an object of the present invention to provide an improved weed puller.

Another object of the present invention is to provide an improved weed puller which is simple in construction and operation.

An additional object of the present invention is to provide an improved weed puller which is inexpensive to purchase and requires virtually no maintenance.

A further object of the present invention is to provide an improved weed puller which can quickly and easily be engaged with or disengaged from a weed while the gardener is in an erect position.

Another object of the present invention is to provide an improved weed puller which can quickly and easily remove weeds with little physical effort on the part the gardener.

These and other objects and features of the present invention will be apparent from the following detailed description, taken with reference to the figures of the accompanying drawing.

DETAILED DESCRIPTION OF A PREFERRED EMBODIMENT

Figure 1:
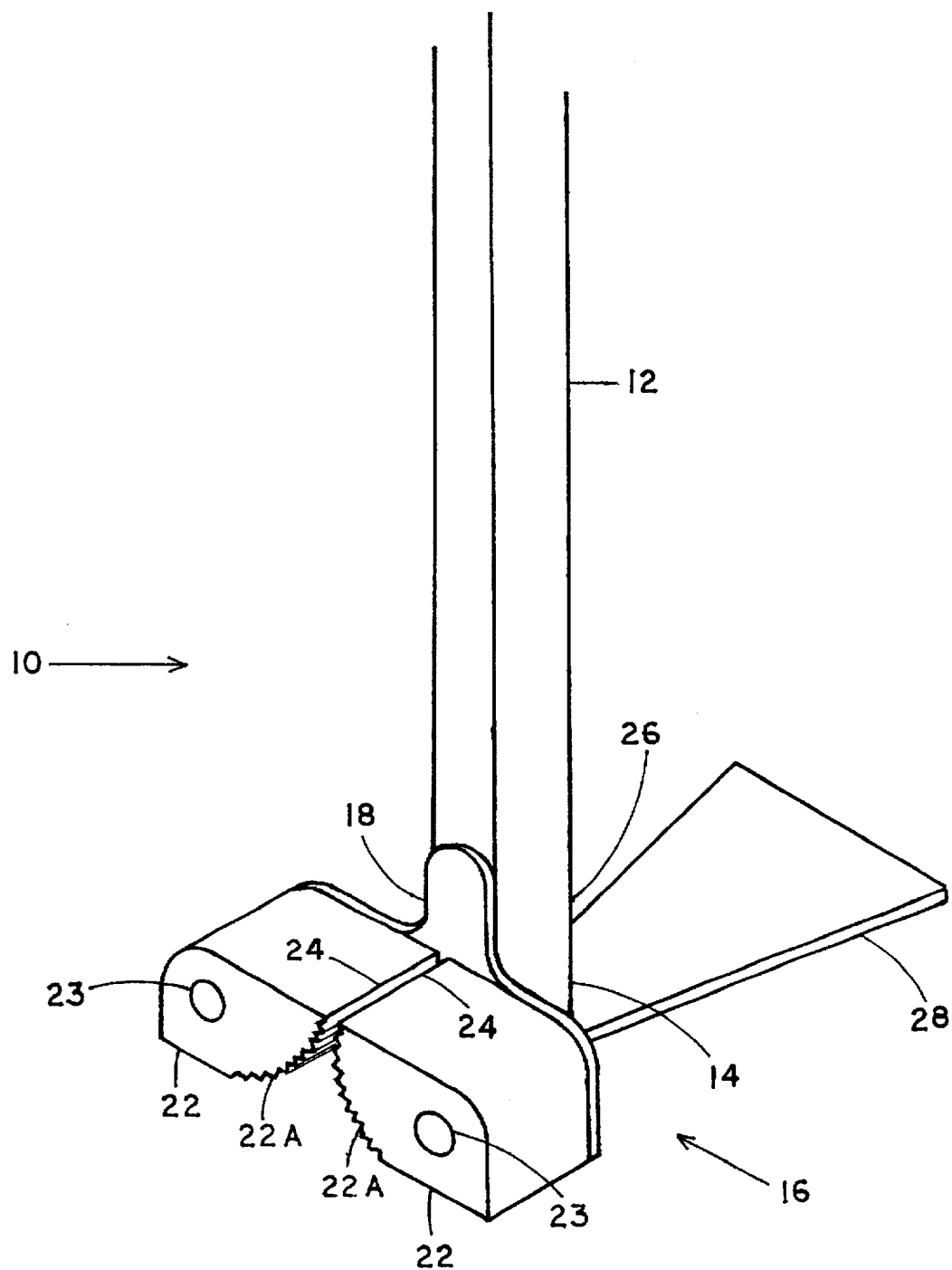
FIG. 1 is a perspective view of a first embodiment of a weed pulling apparatus of this invention.

FIG. 1 is a perspective view of a first embodiment of a weed pulling apparatus of this invention. This embodiment 10 includes an elongate handle portion 12 defining a first lever arm and terminating in a first lower end 14. A second lever arm in the form of a leveraging head member 16 is attached to the first lower end 14 of a first side of said handle 12.

Handle 12 is preferably of sufficient length to allow the user to use the tool 10 in an erect position and provide him maximum leverage and mechanical advantage.

The leveraging head member 16 has a laterally extending frame plate 18 which supports a weed clamp in the form of a cam cleat 20 defined by a paired of pivoting jaws 22 adapted to close toward and against each other, each jaw providing a clamping surface 24 relative to the other. Each jaw is pivotally mounted on a pivot pin 23 defining a pivotal axis substantially perpendicular to the longitudinal axis of the handle 12, and substantially parallel to ground level when the tool is upright: in its normal operating position. The pivoting jaws 22 each preferably have serrated gripping surfaces 22a facing each other for clamping against a plant stem to prevent vertical slippage between the jaws when the plant is being uprooted.

A second side 26 of the leveraging head 16 (opposite the first side 18) includes a laterally and outwardly extending lever arm 28. The innerside or base of the leveraging arm 28, together with the lower end of the handle 12, functions as the fulcrum for the lever arm 12 with its attached weed clamp 20. The force of gravity will normally maintain the eccentrically mounted pivot jaws to pivotally move toward their closed position as shown in FIG. 1. Spring loaded or spring bias means (not shown) may, of course, be provided to supplement the normal biasing action of the eccentrically mounted jaws toward each other.

In use, the user holding the handle in a near upright slightly inclined position can move the jaws 22 into engagement with the vertical weed, plant or stem and by moving the jaws downwardly of the stem cause the stem to cam the jaws open so as to fully engage both sides of said stem. Thereupon, all the user need do is to pull back or away from the weed or plant to be uprooted and with the jaws firmly engaging the stem so that the handle 12 moves about its fulcrum and second leveraging arm 28 to forcefully uproot the plant stem as desired.

Figure 2:
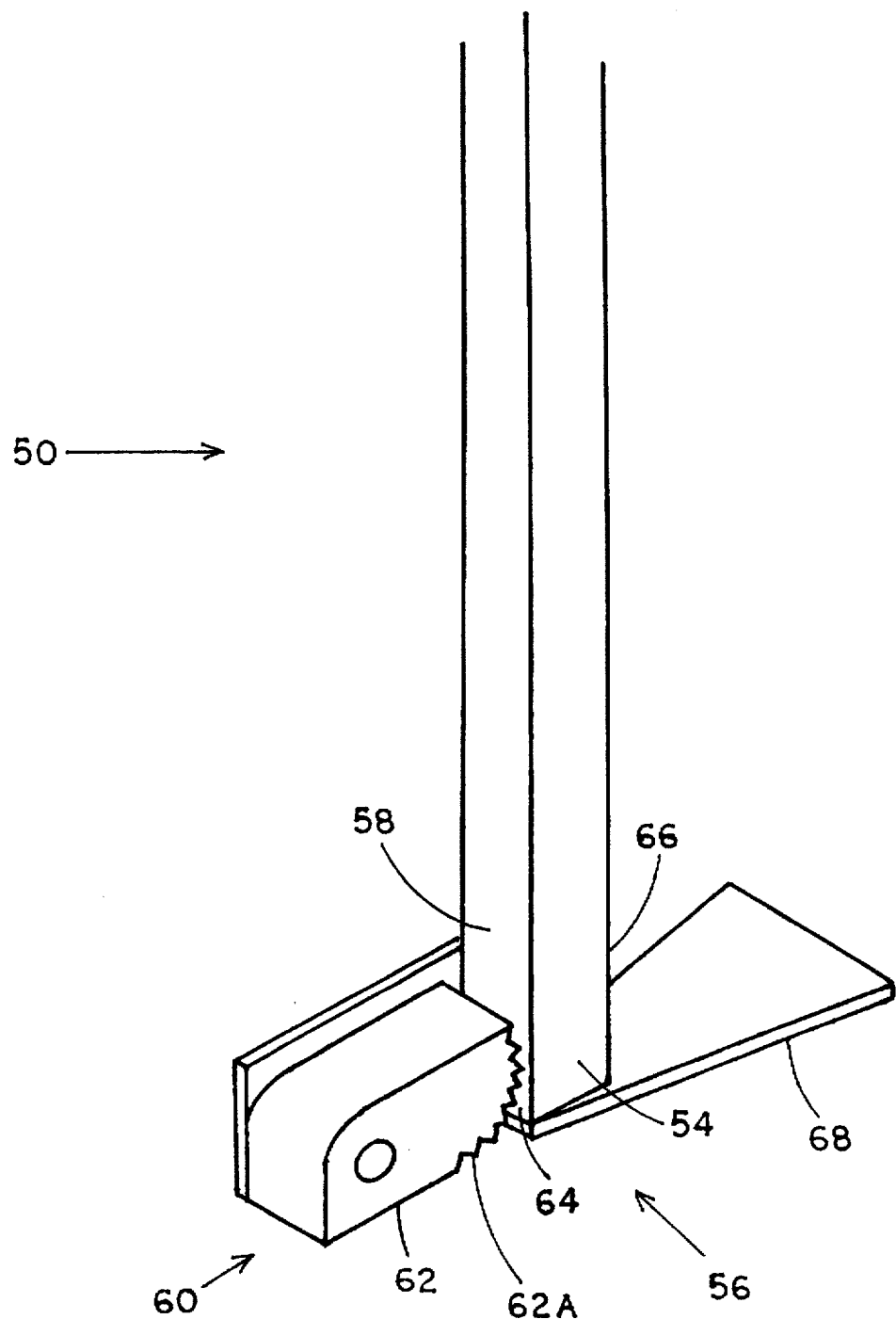
FIG. 2 is a perspective view of a second embodiment of a weed pulling apparatus of this invention.

FIG. 2 is a perspective view of a second embodiment of a weed pulling apparatus of this invention. This embodiment 50 also includes an elongate handle portion 52 terminating in a first end 54, with a leveraging head member 56 attached to the first end 54. Handle 52 is again preferably of sufficient length to allow the gardener to use the tool 50 in an erect position. The leveraging head member 56 has a first side 58 bearing a weed clamp in the form of a cam cleat 60 having a single pivoting jaw 62 mounted on a pin whose axis is normal to the longitudinal axis of the leveraging handle and substantially parallel to ground level where the tool is substantially upright. The pivoting jaw 24, adapted to close against clamping surface 64, preferably has a serrated gripping surface 62a facing the clamping surface. A second side 66 of the leveraging head 56 (opposite the first side 58) bears a lever arm 68 for mechanical advantage in pulling weeds captured in the weed clamp 60.

In use, when a weed or any other article, not shown, is inserted between the pivoting jaw and its opposing clamping surface, downward movement of the pivoting jaw, or upward movement of the article, will cause the article to engage the gripping surfaces and to cause the pivoting jaw to rotate away from the clamping surface to allow the article to become inserted between the jaw and the clamping surface. Thereafter, relative downward movement of the article, or relative upward movement of the pivoting jaw, will cause the pivoting jaw to rotate toward the clamping surface, to securely grip the article therebetween. Continued movement in the same direction will only serve to cause the pivoting jaw to tighten against the article and the clamping surface. Conversely, relative movement of the article or pivoting jaw in the opposite direction will cause the pivoting jaw to rotate away from the clamping surface and, thereby, to release the grip on the article. The clamp may be made to engage an article, quickly and easily, by simply placing the article adjacent the gripping surface the clamp and rocking the end of the handle and weed clamp downward. This causes the pivoting jaw to rotate away from the clamping surface, and allows the article to become inserted between the pivoting jaw and the clamping surface. Thereafter, by rocking the end of the handle and the weed clamp upward, and using the lever arm for mechanical advantage, the handle and the weed clamp quickly and easily unearth the article. Moreover, this can be accomplished with very little physical effort on the part of the gardener and without any bending, stooping or sitting.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A weed pulling apparatus for rooted vegetation, from the ground comprising:

a normally vertically upright elongate handle defining a first leveraging arm terminating in a lower end;

a ground engaging second leveraging arm attached at an inner end of said second leveraging arm to said lower end of said lower handle end and extending laterally outwardly from a first side of said handle at an angle substantially normal to said elongate handle;

said second leveraging arm also defining a ground engaging fulcrum about which said first leveraging arm pivots;

jaw pivot means mounted to said lower end of said handle on a second side opposite said first side of said lower handle end;

said jaw pivot means defining a pivotal axis substantially perpendicular to the longitudinal axis of said handle and substantially parallel to said ground surface when said handle is in normal upright position;

a weed clamp including at least one jaw;

a clamping surface proximate said at least one jaw;

said jaw mounted on said pivot means to pivot about said axis to close toward and proximate said clamping surface;

said at least one jaw and clamping surface arranged and constructed to engage and clamp the stem of a weed or shrub against slippage whereby when the upper part of said handle is rocked about said fulcrum from upright position in the direction of said first side of said handle.

2. The combination of claim 1 and wherein said clamping surface comprises a second clamping jaw pivotally mounted about an axis parallel to the pivotal axis of said first jaw at spaced predetermined distance from the pivotal axis of said first jaw.

3. The combination of claim 2 and wherein each jaw is eccentrically shaped and defines an arcuate clamping surface;

and wherein the clamping surfaces of said jaws can be forcibly cammed open from a closed position with said clamping surfaces in near proximity to each other to a spaced apart open position to receive and clamp the stem of a plant to be removed.

4. The combination of claim 3 and wherein the eccentrically shaped jaws are pivotally mounted so that gravitational forces normally bias said jaws toward their closed position when the tool is in upright position, and whereby a user can by forcing the arcuate clamping surfaces of the normally closed jaws against a plant stem can cause the stem to cam the jaws open sufficiently for the spring bias jaws to open and clamp against opposite sides of said plant stem to permit forceful pulling up on the stem without substantial vertical slippage of said stem.

5. The combination of claim 4 and wherein the clamping surface of each jaw defines transverse gear teeth type serrations for biting into opposite sides of a plant stem to minimize slippage of said stem to said jaws.

\* \* \* \* \*